(12) United States Patent
Dainty et al.

(10) Patent No.: US 10,514,529 B2
(45) Date of Patent: Dec. 24, 2019

(54) PORTRAIT LENS SYSTEM FORMED WITH AN ADJUSTABLE MENISCUS LENS

(71) Applicant: FotoNation Limited, Galway (IE)

(72) Inventors: Christopher Dainty, Galway (IE); Alexander Goncharov, Galway (IE); Conor J. Sheil, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/913,659

(22) Filed: Mar. 6, 2018

(65) Prior Publication Data

US 2018/0252905 A1     Sep. 6, 2018

Related U.S. Application Data

(60) Provisional application No. 62/467,647, filed on Mar. 6, 2017.

(51) Int. Cl.
*G02B 17/00* (2006.01)
*G02B 17/08* (2006.01)
(Continued)

(52) U.S. Cl.
CPC ........... *G02B 17/0856* (2013.01); *G02B 7/04* (2013.01); *G02B 13/009* (2013.01);
(Continued)

(58) Field of Classification Search
CPC .. G02B 17/0856; G02B 7/04; G02B 13/0035; G02B 13/0055; G02B 13/0065;
(Continued)

(56) References Cited

U.S. PATENT DOCUMENTS 5,159,495 A * 10/1992 Hamblen ............. G02B 3/0087
359/654
2012/0212842 A1     8/2012 Hosoi et al.
(Continued)

OTHER PUBLICATIONS

Fisher, et al, Optical System Design, Second Edition, McGraw Hill, SPIE Press 2008. www.accessengineeringlibrary.com/browse/optical-system-design-second-edition.
(Continued)

*Primary Examiner* — William Choi

(57) ABSTRACT

A portrait lens configuration for meeting handheld device form factor constraints. First and second meniscus lenses each have a reflective surface to provide internal reflections for transmitting light toward a focal plane. A third lens is positioned between the meniscus lenses and the focal plane. The first lens includes an anterior concave surface having a reflective material extending over a portion thereof. Light received by the first meniscus lens can be transmitted therethrough. The reflective material is positioned along the anterior concave surface to receive light transmitted therethrough and reflected back from the second lens. In an associated method the first meniscus lens is positioned to receive light through a first of two opposing refractive surfaces. After each lens provides an internal reflection, reflected light is transmitted through the second of the two opposing surfaces and then through a bore positioned within the second lens to the third lens.

19 Claims, 15 Drawing Sheets

(51) Int. Cl.
*G02B 13/18* (2006.01)
*G02B 7/04* (2006.01)
*G03B 17/56* (2006.01)
*G02B 13/00* (2006.01)
*G02B 15/14* (2006.01)
*G03B 17/17* (2006.01)

(52) U.S. Cl.
CPC ..... *G02B 13/0035* (2013.01); *G02B 13/0055* (2013.01); *G02B 13/0065* (2013.01); *G02B 13/18* (2013.01); *G02B 15/14* (2013.01); *G02B 17/004* (2013.01); *G02B 17/0808* (2013.01); *G02B 17/0888* (2013.01); *G03B 17/565* (2013.01); *G03B 17/17* (2013.01)

(58) Field of Classification Search
CPC ...... G02B 13/009; G02B 13/18; G02B 15/14; G02B 17/004; G02B 17/0808; G02B 17/0888; G02B 17/565; G02B 17/17

USPC ....... 359/716, 717, 727, 732, 735, 736, 753, 359/784, 793, 796
See application file for complete search history.

(56) References Cited

U.S. PATENT DOCUMENTS

| 2015/0103413 A1 | 4/2015 | Uchida et al. |
| 2016/0231540 A1 | 8/2016 | Mercado |

OTHER PUBLICATIONS

O'Shea, "Elements of Modem Optical Design", John Wiley & Sons, Inc. 1985.

* cited by examiner

PORTRAIT LENS SYSTEM FORMED WITH AN ADJUSTABLE MENISCUS LENS

CLAIM OF PRIORITY

This application claims priority to provisional patent application Ser. No. 62/467,647, titled Portrait Lens Concept in a Mobile Phone Camera, filed 6 Mar. 2017.

FIELD OF THE INVENTION

This invention relates to lens systems and, more specifically, to systems and methods for portraiture photography. In one series of embodiments the invention provides a portraiture lens system suitable for mobile phone cameras.

BACKGROUND OF THE INVENTION

The convenience of an imaging device integrated within a handheld electronic device has spurred advancement of technology to improve digital image quality within small form factor constraints. Specifically, there have been significant advancements in image resolution, moving lenses, autofocus features and dual lens systems providing optical zoom capabilities. Yet smart phone cameras have been optically limited due to the constraints of the compact format. To some extent the space constraints have been dealt with by folding the optical path to provide longer focal lengths and larger images. See, for example, U.S. 2016/0231540 which discloses use of folded optics to provide a telephoto lens system compatible with space constraints of a smart phone. There is continued demand for improved designs that enhance the versatility of mobile phone cameras and also improve the image quality of lens systems within the constraints of small form factor cameras.

SUMMARY OF THE INVENTION

According to one series of embodiments of the invention, a lens configuration is designed to acquire portrait images. The system is adaptable, e.g., scalable, for meeting the varied factor constraints to effect integration in a handheld camera device, such as a mobile phone or tablet computer. The configuration includes first and second meniscus lenses. Each meniscus lens has a reflective surface to provide internal reflections. The meniscus lenses are aligned along an optical axis for transmitting light from an object along a path toward a focal plane. At least a third lens is positioned between the meniscus lenses and the focal plane. The first lens includes an anterior concave surface having a reflective material extending over a portion thereof so that light received by the first meniscus lens from the object can be transmitted through the first lens. The reflective material is positioned along the anterior concave surface to receive light which has been transmitted through the first lens and reflected back from the second meniscus lens. Light received by the reflective material may be transmitted along a path which passes through the second meniscus lens and then through the third lens. The path of reflected light transmitted through the second meniscus lens may pass through a bore situated in the second lens before reaching the third lens. The path of the reflected light transmitted through the second meniscus lens may pass entirely through the bore which may be centrally situated in the second lens. The third lens may be a negatively powered lens or group of lenses serving to adjust focus of light or change image size along the focal plane.

In the lens configuration a posterior surface of the first meniscus lens and an anterior surface of the second meniscus lens are surfaces facing one another and having complementary radii of curvature enabling said surfaces to be brought within 0.06 mm of one another.

Also, the bore may be centrally positioned within the second meniscus lens and may extend through a posterior surface of the second lens. The posterior surface of the second lens may include a reflective material providing the reflective surface of the second meniscus lens, providing the internal reflections therein. The reflective material extends radially outward with respect to the optical axis and away from the bore.

Adjustment to focus objects at varied object distances $L_{OBJ}$ along the focal plane may be effected by movement of the third lens along the optical axis. With this arrangement the lenses may be configured to focus images of objects on the focal plane over a range of object distances $L_{OBJ}$ extending from 500 mm or less, e.g., from 500 mm or less to $L_{OBJ}=\infty$.

In another embodiment, adjustment to focus objects at varied object distances $L_{OBJ}$ along the focal plane is effected by movement of the second meniscus lens along the optical axis. The lenses may be configured to focus images of objects on the focal plane over a range of object distances $L_{OBJ}$ extending from 500 mm or less to $L_{OBJ}=\infty$.

According to another series of embodiments of the invention, a lens system comprises a first meniscus lens, a second meniscus lens and a third lens each positioned along a common optical axis to transmit light received from an object to a focal plane. The first lens includes a concave transmissive first surface and a convex parabolic second surface having a first radius of curvature. The second lens includes a concave parabolic first surface characterized by a second radius of curvature, complementary to the first radius of curvature of the second surface of the first lens. The second lens also includes a convex second surface having a bore positioned along the optical axis. When positioned between the object and the focal plane, to provide an image of the object along the focal plane: (i) the concave, transmissive first surface of the first lens faces the object to receive and refract light traveling from the object for entry into the lens system through the first lens for focusing along the focal plane; (ii) the concave parabolic first surface of the second lens is positioned to face the convex parabolic second surface of the first lens in spaced apart relation from the convex parabolic second surface of the first lens at a separation distance not exceeding 0.06 mm for all operative portions of the surfaces through which light passes before becoming focused along the image plane; (iii) light from the object which is transmitted through the concave parabolic second surface of the second lens is internally reflected along the second surface of the second lens; (iv) the light internally reflected along the second surface of the second lens is then internally reflected along the first surface of the first lens; and (v) the light internally reflected a second time enters the bore and is transmitted through the third lens to the focal plane. Any or all refracting and reflecting portions of all surfaces may be aspheric.

In one embodiment, adjustment to focus objects at varied object distances, $L_{OBJ}$, along the focal plane is effected by movement of the third lens along the optical axis. Accordingly, the lenses may be configured to focus images of objects on the focal plane over a range of object distances $L_{OBJ}$ extending from 500 mm or less. The lenses may provide a range of focus of images of objects on the focal plane for object distances $L_{OBJ}$ extending from 500 mm or less to $L_{OBJ}=\infty$.

In another embodiment, adjustment to focus objects at varied object distances, $L_{OBJ}$, along the focal plane is effected by movement of the second lens along the optical axis. This may change the separation distance between the first and second lenses. The lenses may be configured to focus images of objects on the focal plane over a range of object distances $L_{OBJ}$ extending from 500 mm or less to $L_{OBJ}=\infty$.

According to still another embodiment of the invention, a method is provided for generating an image of an object by providing a light expansion and image objective stage with a set of lenses comprising first and second meniscus lenses, each arranged along an optical axis to provide an internal reflection of light received from the object. The first of the meniscus lenses is positioned to receive the light into the stage through a first of two opposing refractive surfaces. After each of the two lenses provides an internal reflection, the reflected light is transmitted through the second of the two opposing surfaces of the first lens and then through a bore positioned within the second meniscus lens to a negative third lens. In one embodiment, the light expanding and condensing stage provides light expansion before the light undergoes an internal reflection in the second lens, and at least one of the internal reflections condenses the light.

BRIEF DESCRIPTION OF THE FIGURES

The following drawings are provided to facilitate understanding of the inventive concepts described in the written description which follows, where.

Figure 1:
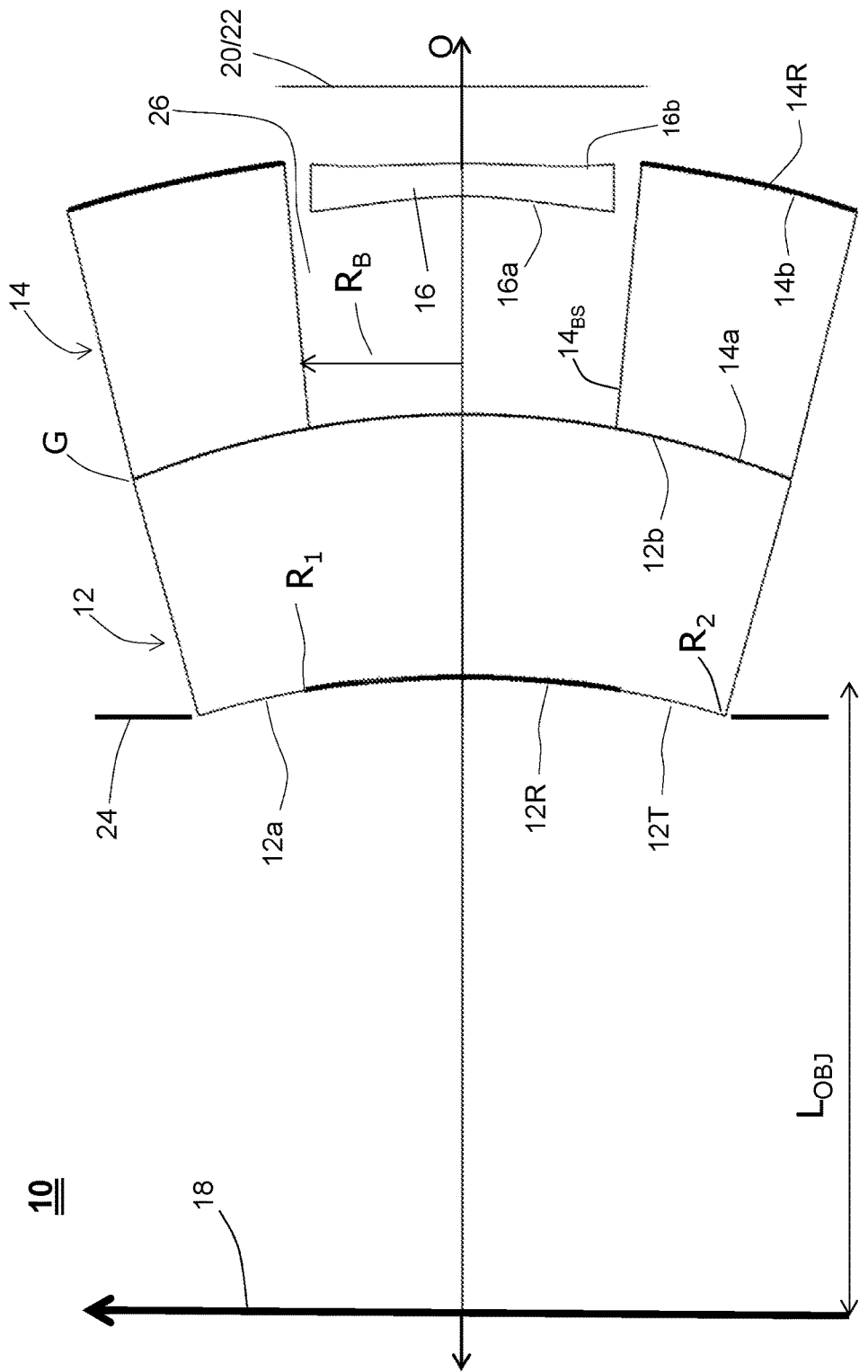
FIG. 1 illustrates a configuration of a lens system according to a first embodiment of the invention.

Like reference numbers are used throughout the figures to denote like components. Numerous components are illustrated schematically, it being understood that various details, connections and components of an apparent nature are not shown in order to emphasize features of the invention. Various features shown in the figures are not to drawn scale.

DETAILED DESCRIPTION OF THE INVENTION

Conventionally, portraiture photography is performed with a relatively long focal length lens providing a 28-30 degree field of view (FoV). A typical focal length, f, for a 24×326 mm full frame camera is 85 mm. By way of comparison, cameras in mobile phone devices typically provide images over a 76-78 degree field, more than twice the normal FoV range for portraiture applications. The face in a portrait image is well-focused to exhibit a desired level of detail while background features are deliberately blurred (e.g., optically defocused for distant objects), in order to reduce unnecessary distraction from the main subject in the image.

The extent of the background blur is inversely proportional to the depth of field, $\Delta L$, the distance in object space over which a given lens configuration provides an acceptable focus. For a given linear (lateral) magnification, m, from object space to image space, and a given object distance, $L_{OBJ}$, measured from the object to the lens, the depth of focus, $\Delta z$, in image space may be expressed as $\Delta z = 2\lambda f^2/D^2$ where D is the lens aperture diameter. Also, noting that $m^2$, the longitudinal magnification, may be expressed as $(f/L_{OBJ})^2$, the depth of field, $\Delta L$, may be expressed as $\Delta L = \Delta z/m^2$, and the depth of field reduces to $$\Delta L = 2\lambda (L_{OBJ}/D)^2.$$

With the depth of field, $\Delta L$, inversely proportional to the square of the lens aperture diameter D, for a given object distance $L_{OBJ}$, use of a relatively large diameter camera lens is advantageous. When D is increased by a factor of two, the background blur increases by a factor of 4. Maintaining lens f-number f/D leads to a longer focal length. In the past, it has not been feasible to incorporate this level of optical performance in a mobile phone housing having a z-dimension on the order of five mm. Embodiments of the invention comprise folded optical systems, or catadioptric lens systems, providing double ray paths. These features can, alone or in combination, enable an extended focal length to retain a lens speed on the order of, for example, f/2, within the five mm format.

Optical systems with a double ray path usually feature a central obscuration, which can also be beneficial for the portrait lens concept. The central part in the background blur is formed at a slower f-number and therefore exhibits a greater depth of focus, i.e., staying in focus over larger object-background distances. Point-like highlights in the image background might noticeably appear as circles, missing their central portion due to the shadow of the central obscuration on the image sensor. For more aesthetically pleasing, uniform bokeh, the central part of such circles may be filled with similar light level background in digital post-processing. This requires extra image processing for such lenses.

In high-resolution applications such as iris imaging for identity verification, or group photography, the central obscuration is not desirable, since it noticeably reduces image contrast. Embodiments of the invention are based on recognition that, for portraiture photography, diffraction-limited image quality need not be a requirement, and some residual aberrations are acceptable or even desirable for achieving a so-called "soft" portrait effect. Each of these considerations render the disclosed optical design features advantageous for portrait lens applications. For these reasons, those skilled in the art will recognize that numerous combinations of the disclosed design features will result in suitable lens system designs for portraiture photography.

Figure 5:
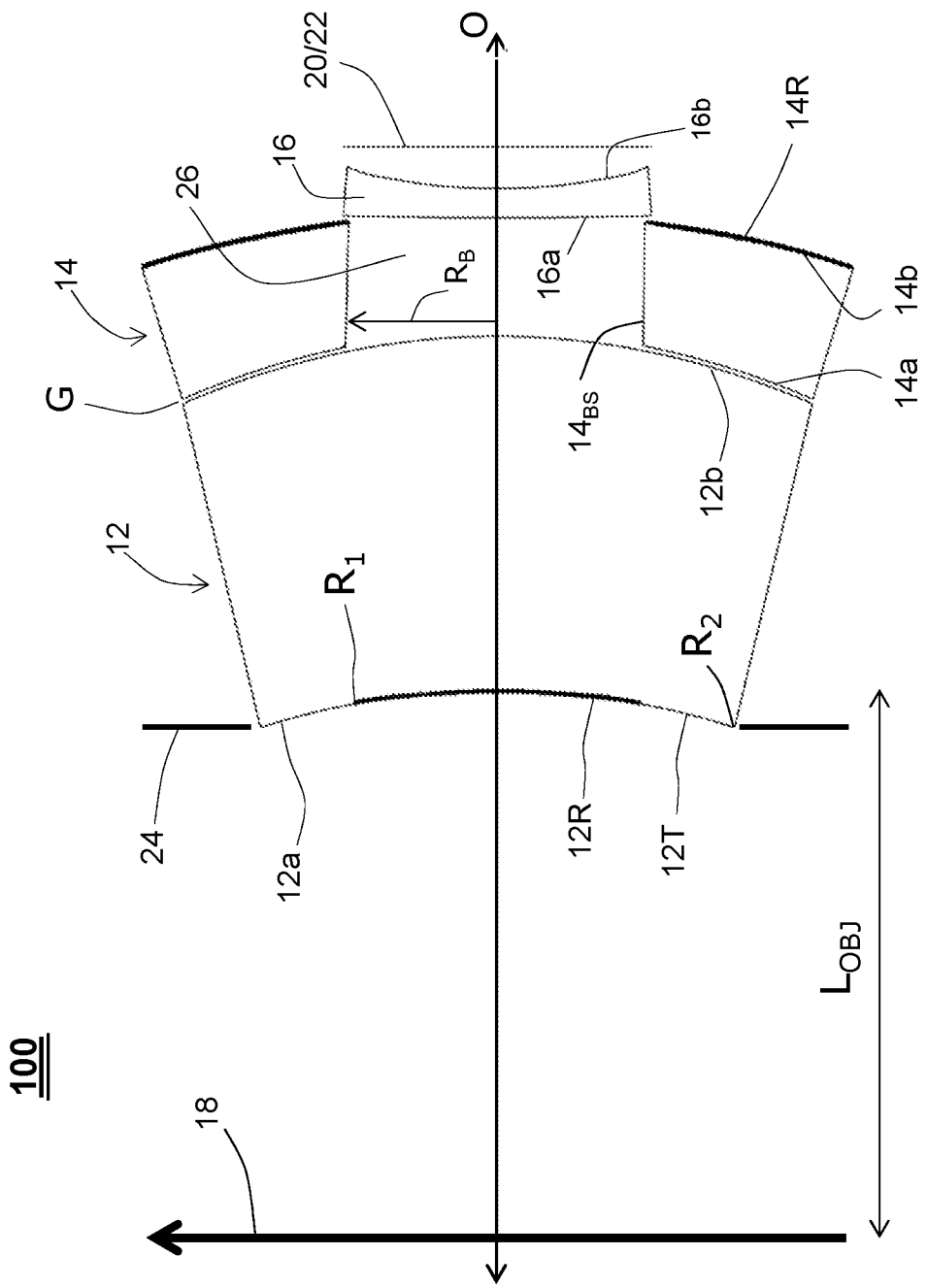
FIG. 5 illustrates a configuration of a lens system according to a second embodiment of the invention.

FIGS. 1 and 5 illustrate two embodiments of a lens system 10 according to the invention. A first meniscus lens 12, a second meniscus lens 14 and a negative-powered third lens 16 are arranged along a common optical axis, O. The system transmits light received from an object 18 to a sensor array 20 positioned in a focal plane 22 along which an image of the object is presented. In the embodiment illustrated in FIGS. 1 and 2, the lens 16 serves as a field lens which is adjustable along the optical axis to effect image focusing over an object distance, $L_{OBJ}$, ranging from 500 mm (FIGS. 2A and 2C) or less to $L_{OBJ}=\infty$ (FIGS. 2B and 2D). In the embodiment illustrated in FIGS. 5 and 6, the second meniscus lens 14 is adjustable along the optical axis to effect image focusing over the object distance which, again, ranges from $L_{OBJ}=500$ mm or less to $L_{OBJ}=\infty$. More generally, embodiments of the systems 10 and 100 may provide a range of focus for object distances of 500 mm or less to $L_{OBJ}=\infty$.

Still referring to FIG. 1, an adjustable stop 24 is positioned in front of the first meniscus lens 12, which lens receives light from the object 18 into the system 10. In accord with the disclosed design, the stop is placed at the periphery of the front surface 12a of the lens 12. It will be recognized by those skilled in the art that, for the exemplary system specifications, small displacements of the stop position from the illustrated location will degrade image quality.

The lens 12 includes (i) a concave aspheric surface as the front lens 12a, which faces the object and (ii) a convex parabolic surface 12b of radius −6.32 mm facing the focal plane 22. The surface 12a is partially transmissive and partially reflective, with a peripheral portion of the lens 12 positioned to refract light entering the lens assembly. For the illustrated embodiments, a central region along the surface 12a includes a reflective surface 12R, e.g., a silvered surface. The surface 12R renders the central region of the surface 12a opaque to transmission of light coming into the system and effects reflections within the system. The surface 12R extends radially from the axis, O, a distance $R_1=1.2$ mm from the axis. A transmissive surface 12T extends along an outer portion of the lens surface 12a, beginning at the radial distance $R_1=1.2$ mm from the optical axis. The transmissive surface 12T extends to a radial distance $R_2=2$ mm from the optical axis, O, allowing refraction of light entering into the system 10 for expansion.

A concave parabolic first optical surface 14a of the second lens of radius −6.32 mm faces the convex parabolic surface 12b of the first lens in a spaced-apart relation indicated by gap G, e.g., an air gap. The surface 14a has a radius of curvature complementary to the radius of curvature of the convex parabolic surface 12b. For a given value of gap G, the magnitude of the radius of curvature of each surface 12b, 14a is substantially the same. Generally, for applications of the lens system 10, the separation distance between adjacent portions the lenses 12 and 14 may extend to 0.06 mm or more. In the embodiment of FIG. 2, gap G provides a fixed spacing between the lenses 12 and 14 which, as measured along the optical axis, is a 0.01 mm separation between adjacent surfaces. By stating that the magnitude of the radius of curvature of each surface 12b and 14a is substantially the same, it is meant that along operative portions of the optical surfaces, for adjacent portions of the surfaces, the difference in value between the magnitudes of the complementary radii of curvature is sufficiently small that the operative portions of the lens surfaces adjacent one another do not come into physical contact or otherwise exhibit misalignment which causes noticeable degradation in image quality.

A convex, aspheric second optical surface 14b of the second lens faces the focal plane 22. The surface 14b is made reflective with a coating 14R (e.g., a silvered surface) formed thereon to internally reflect light transmitted through the lens surface 14a. The second lens 14 includes a bore 26 which extends through each of the lens surfaces 14a, 14b.

The bore shape is defined by a lens bore surface $14_{BS}$ which extends along an interior central portion of the lens body. The bore 26 is symmetrically aligned about the optical axis such that, at each point along the optical axis within the bore, the surface $14_{BS}$ resides a fixed radial distance $R_B$ from the optical axis, while the radial distance $R_B$ varies as a function of position along the optical axis. In the disclosed embodiments the bore shape defined by the surface $14_{BS}$ is frusto-conical. The size of the bore $R_B$ increases from a minimum radial dimension near the surface 14a.

Along the refractive surface 14a, $R_B=1.17$ mm. The lens surface 14a extends radially outward from $R_B=1.17$ mm to the lens periphery, e.g., to a radial distance of 2.5 mm from the optical axis. Commensurate with the coating 14R, the reflective lens surface 14b extends radially outward from points where the surface $14_{BS}$ and the surface 14b meet. This corresponds to a radial distance $R_B$ of 3.0 mm, measured from the optical axis to the lens surface 14b. The reflective lens surface 14b may fully extend to the lens periphery, a radial distance of 3.0 mm from the optical axis. In the illustrated embodiments the bore 26 is an air cavity into which converging light internally reflected within the first lens 12 is transmitted directly to the third lens 16 without propagating through the body of the second lens 14. In the embodiment of FIGS. 1 and 2 the third lens 16 is movable along the bore to focus through the entire range of object distances $L_{OBJ}$. The lens 16 comprises an anterior first surface 16a and a posterior surface 16b which is convex in the paraxial region and concave in the marginal region.

Having an adjustable position along the optical axis, the lens 16 acts as both a field lens and a refocusing element. For this configuration, FIGS. 2A-2D illustrate select ray paths of incoming light travelling from the object 12 and into the lens system 10.

Figure 2A:
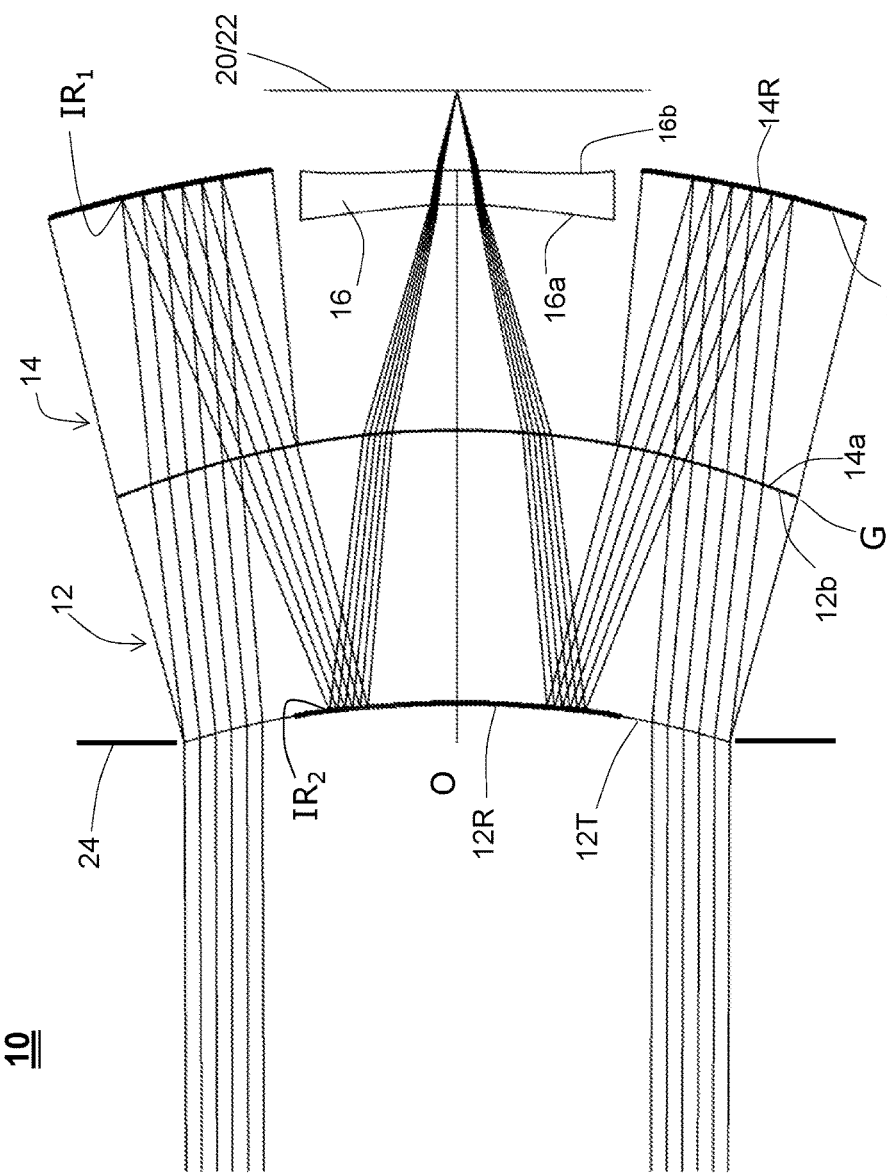
FIGS. 2A-2D are ray diagrams for the lens system of FIG. 1.
Figure 2B:
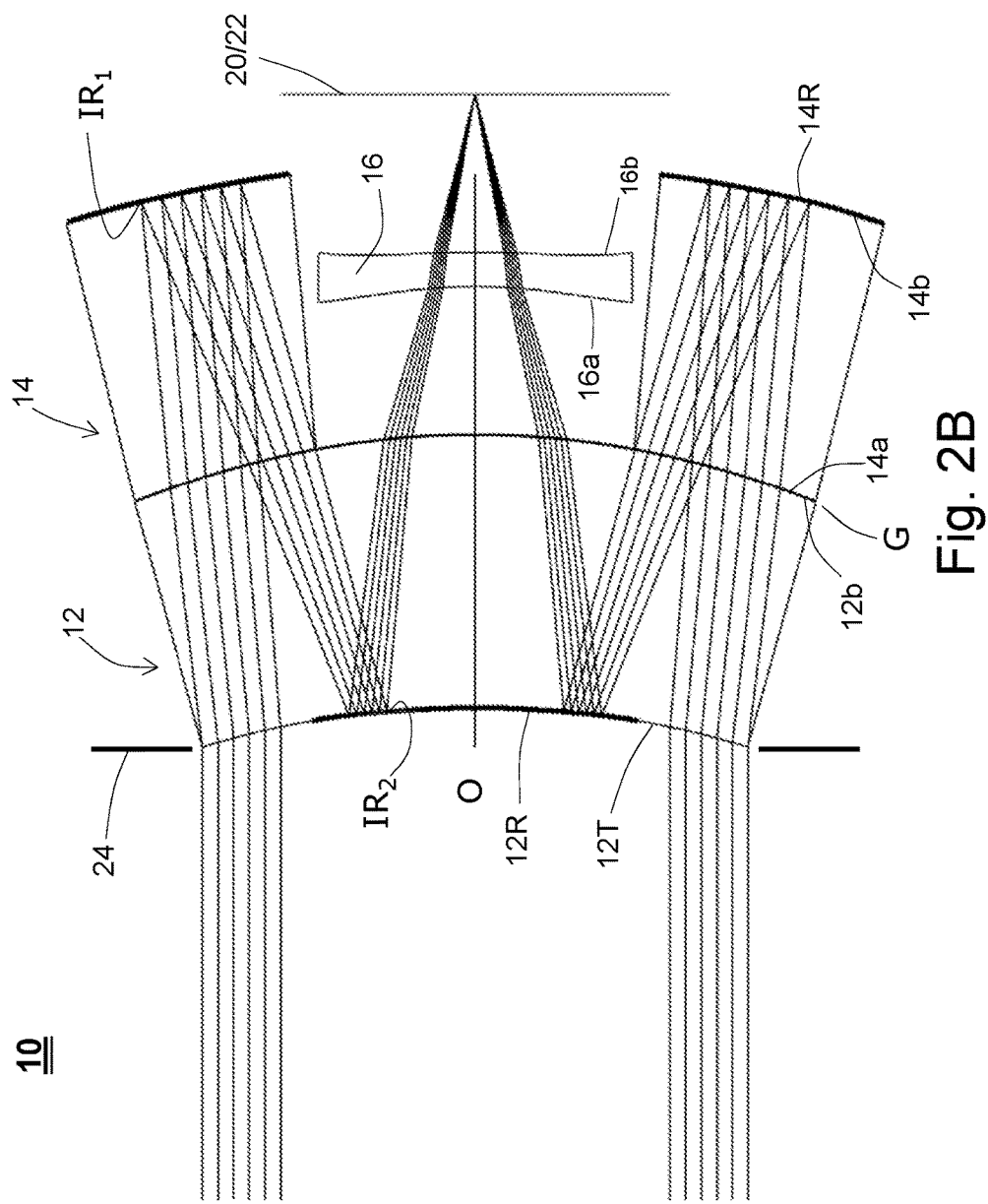
Figure 2C:
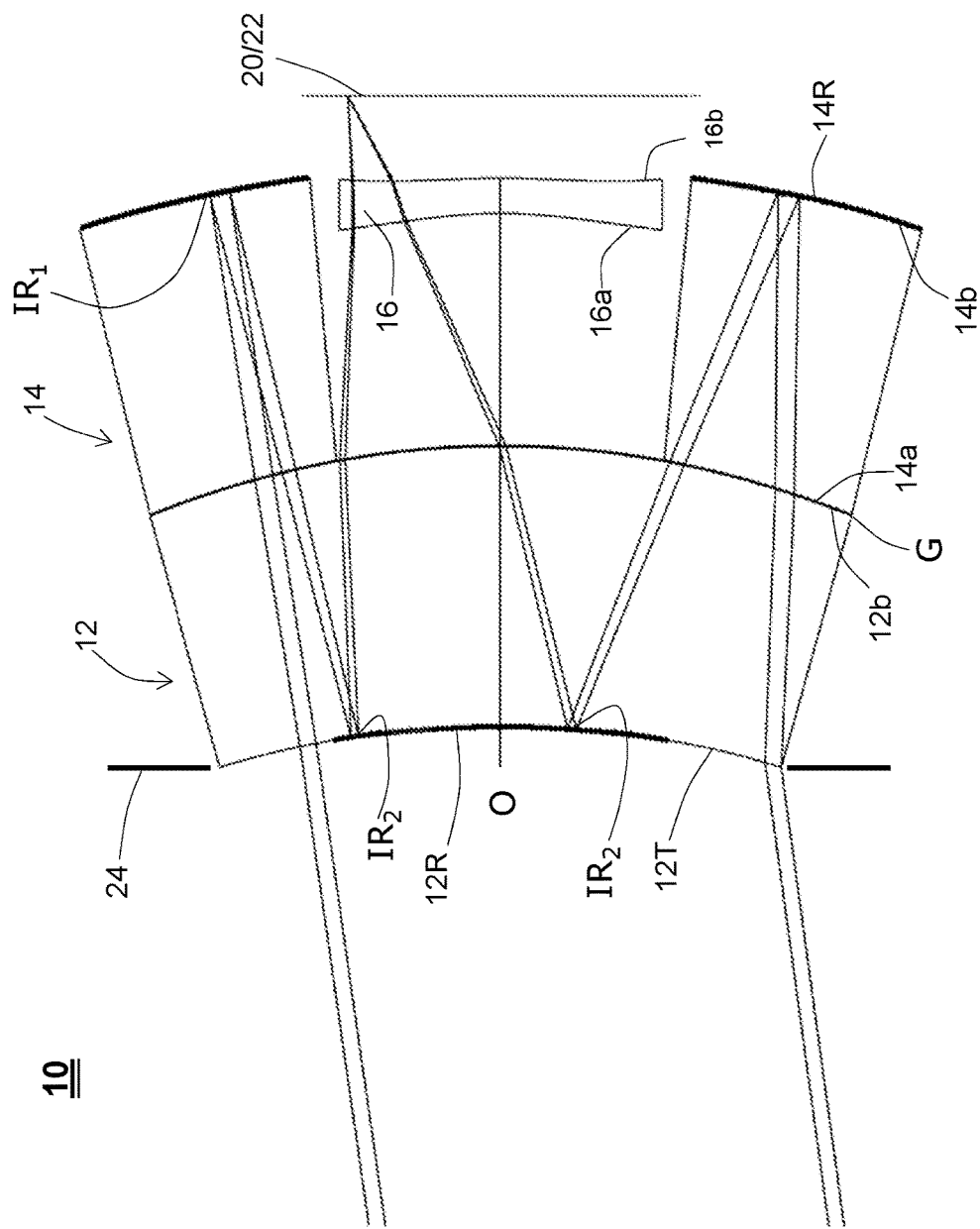
Figure 2D:
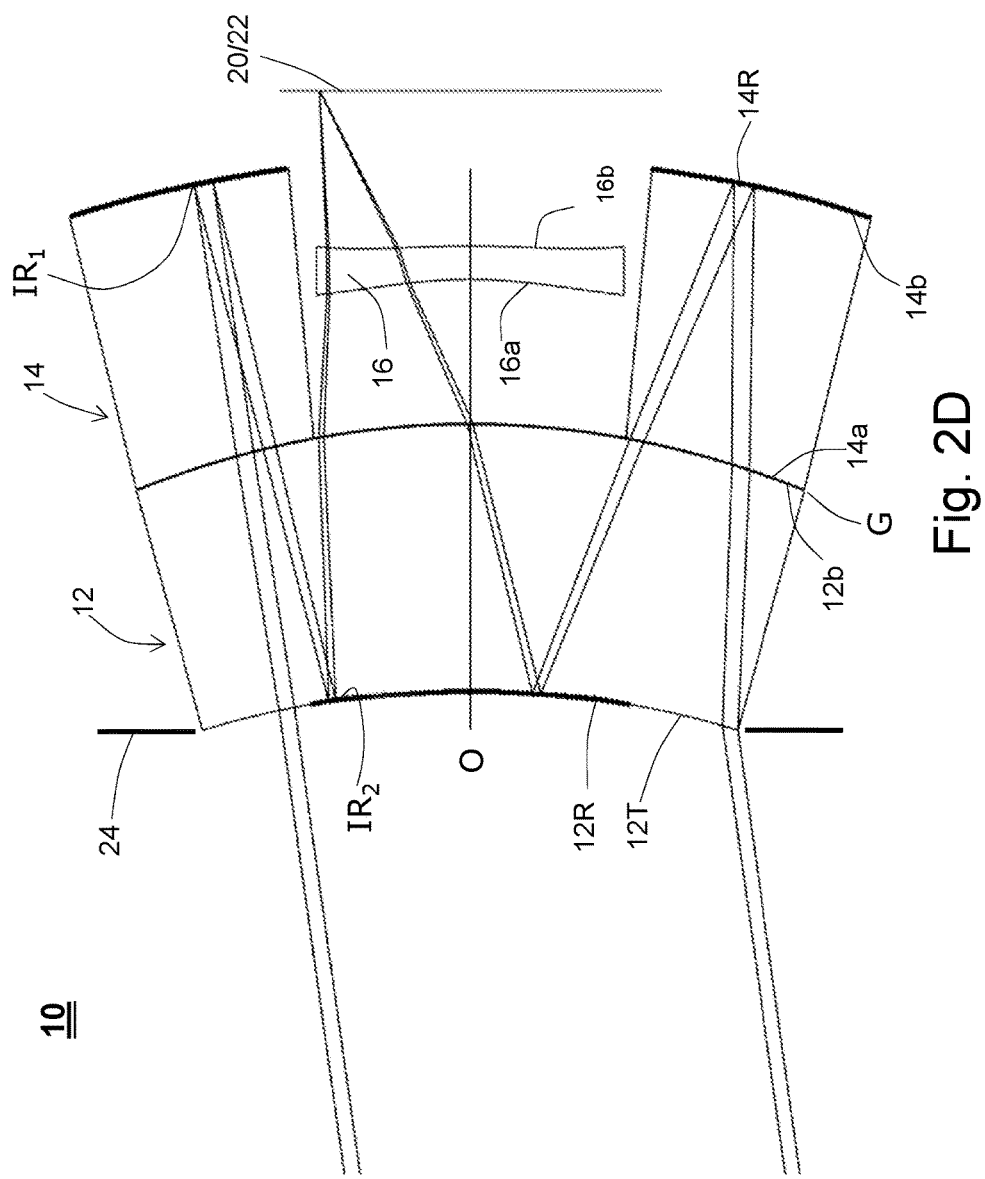

FIGS. 2A and 2B illustrate the paths of rays coming into the system 10 when the object 18 is positioned on-axis. In FIG. 2A the lens 16 is positioned to focus the object on the sensor array 20 at a distance $L_{OBJ}=500$ mm. In FIG. 2B the lens 16 is positioned to focus the object on the sensor array 20 when $L_{OBJ}=\infty$. FIGS. 2C and 2D illustrate the paths of rays from the object 18 when the object is positioned eight degrees off-axis. In FIG. 2C the lens 16 is positioned to focus the object on the sensor array 20 at the distance $L_{OBJ}=500$ mm. In FIG. 2D the lens 16 is positioned to focus the object on the sensor array 20 when $L_{OBJ}=\infty$.

Light travelling from object 12 enters the system 10 through the anterior transmissive lens surface 12T of the first lens 12, passes through the opposing posterior second optical surface 12b, through gap G and through anterior surface 14a of the second lens. The transmitted light then undergoes first internal reflections IR1 along the posterior convex aspheric surface 14b, returning through the lens surface 14a of the second lens 14, through gap G and through the posterior second lens surface 12b of the first lens 12 to be incident along the reflective surface 12R where the light undergoes second internal reflections IR2. After undergoing the multiple internal reflections within the lenses 12 and 14, a portion of the light exits the first lens 12 through the posterior second lens surface 12b for entry into the bore 26 for transmission through the third lens 16 to the focal plane 22. With the lenses 12 and 14 providing an objective stage, the adjustable lens 16 serves to adjust image quality, sharpness, depth or size and refocus the image for varied object distances. In other embodiments, the lens 16 could be a field lens stage comprising multiple lens elements to, for example, correct challenging off-axis aberrations including but not limited to field curvature and chief ray angle.

For an exemplary application, the complementary radii of curvature for the parabolic lens surfaces 12b and 14a are −6.32 mm. The sag, z, for each rotationally aspheric lens surface 12a, 14b, 16a and 16b having a vertex radius of curvature, $r_0$, is calculable from the following exemplary sag equation:

$$z = y^2/2r_0 + Ay^4 + By^6 + Cy^8 + Dy^{10} + Ey^{12}$$

where y is the radial coordinate perpendicular to the optical axis. The sag equation comprises (i) a second order term $y^2/2r_0$, descriptive of a parabolic base term, the more general form of which includes a conic constant term describing conical departure from the familiar sphere, and (ii) a series of higher order even asphere polynomial terms (e.g., to the $12^{th}$ order) where the polynomial coefficients are given in Table 1A. For further discussion, see Fisher, et al., *Optical System Design,* Second Edition., McGraw Hill, SPIE Press 2008. See, also, O'Shea, *Elements of Modern Optical Design,* John Wiley & Sons, Inc. 1985.

For the embodiment of FIGS. 1, 2A and 2C, with $L_{OBJ}$=500 mm, the back focal distance is 0.59 mm and the axial distance between the posterior surface 12b of lens 12 and the anterior surface 16a of lens 16 is 1.66 mm. Tables 1A and 1B provide exemplary specifications for lenses 12, 14 and 16 according to the embodiment of FIGS. 1 and 2.

image diameter on the sensor array 20, nominally sufficient to capture the head of a subject at a minimum distance of about 600 mm.

Figure 3B:
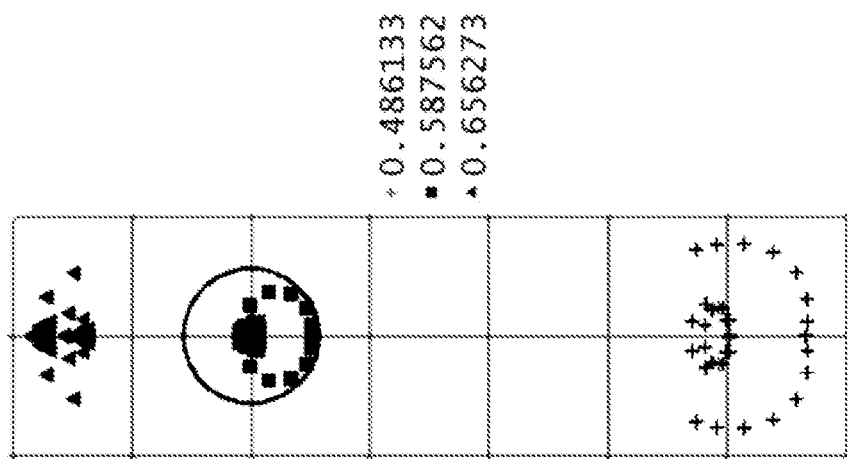
FIGS. 3A and 3B present on-axis and off-axis spot diagrams for the lens system of FIG. 1.
Figure 3A:
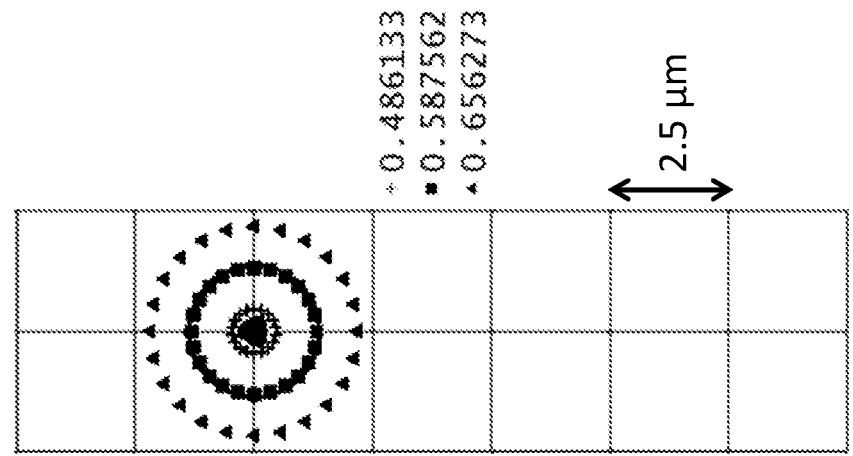
Figure 4:
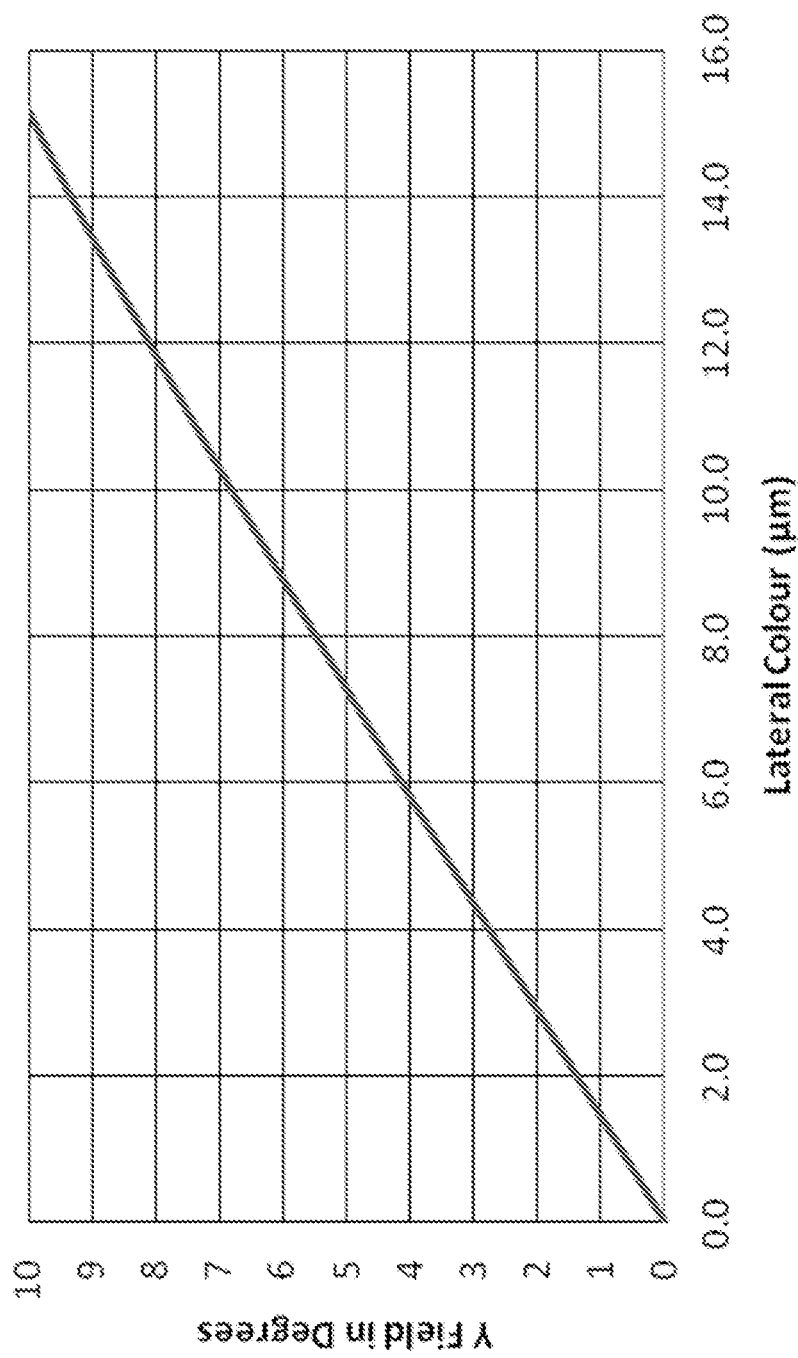
FIG. 4 illustrates a lateral color distribution for the lens system of FIG. 1.

The Total Track Length (TTL) based on the central thickness of the lenses is 4.5 mm. The image quality is diffraction limited (see FIG. 3) with an Airy disk radius, $R_{Airy}$, of 1.4 microns, (i.e., $R_{Airy}$=1.22 λf/D) which cannot be resolved by the smallest (0.9 micron) available pixels. Thus, the lens is detector limited. Image distortion is about one percent at $L_{OBJ}$=500 mm and two percent for $L_{OBJ}$ at infinity. The inner side of the lens 14, i.e., along the surface $14_{BS}$, provides for baffling of stray light. Nonetheless, stray light baffling creates a significant vignetting effect for field angles larger than 6 degrees. Spot diagrams for the lens system 10 are presented in FIG. 3 at $L_{OBJ}$=500 mm for points on-axis (FIG. 3A, left) and at the full field of 10 degrees (FIG. 3B, right). The legend in FIG. 3 refers to wavelengths in μm. The data were acquired at 0.486133 μm, 0.587562 μm and 0.656273 μm. The Airy disk is shown as a circle with radius 1.38 μm. Lateral colour distribution, such as shown in FIG. 4, can be digitally corrected.

FIGS. 5 and 6 illustrate a lens system 100 according to a second embodiment of the invention where illustrated features are annotated with the same reference numerals

TABLE 1A

Sag Equation Polynomial Coefficients for Lens System 10

| Lens | A | B | C | D | E |
|---|---|---|---|---|---|
| 12 (anterior) | −1.684 × 10⁻³ | 1.794 × 10⁻⁴ | −9.421 × 10⁻⁵ | 2.086 × 10⁻⁵ | −1.754 × 10⁻⁶ |
| 14 (posterior) | −2.646 × 10⁻⁴ | −3.239 × 10⁻⁶ | 7.062 × 10⁻⁷ | −7.953 × 10⁻⁸ | 3.033 × 10⁻⁹ |
| 16 (anterior) | 0.075000 | −0.030356 | 0.006816 | −4.9181 × 10⁻⁴ | 0 |
| 16 (posterior) | 0.078579 | −0.025847 | 0.004187 | 1.2530 × 10⁻⁴ | 0 |

TABLE 1B

Lens Specifications for Embodiment of Lens System 10

| Lens | Anterior Radius | Posterior Radius | Central Thickness | Material | Asphericity |
|---|---|---|---|---|---|
| 12 | −7.581 mm | −6.323 mm | 2.0 mm | SF5 | Anterior Surface |
| 14 | −6.323 mm | −10.415 mm | 2.0 mm | BK7 | Posterior Surface |
| 16 | −3.325 mm | −6.790 mm | 0.25 mm | BK7 | Anterior and Posterior Surfaces |

To summarize features of the lens system 10, two meniscus lenses 12 and 14 are brought together with their parabolic surfaces (each having radius of curvature of −6.32 mm) in almost full contact (i.e., an axial separation on the order of 0.01 mm). The other surfaces of these lenses are used to perform internal reflections, each being modified according to a $12^{th}$ order even asphere sag equation. With a portion of the aspheric surface 12A of the front lens used as a refractive surface having an aperture diameter ranging from $D_{min}$=2.4 mm to $D_{max}$=4 mm, this results in transmission of approximately 64 percent of light incident on the surface 12a passing through the transmissive lens surface 12T.

The second lens 14 includes a central bore opening which may, for example, be cylindrical or frusto-conical in shape, through which light passes to the third lens 16, which acts as both a field lens and refocusing element. The object distance range of focus is from infinity to 500 mm. The full field of view is 20 degrees, which corresponds to 200 mm linear size in object space (at $L_{OBJ}$=567 mm) and 2.8 mm assigned to like features of the first embodiment as shown in FIGS. 1 and 2. A first meniscus lens 12, a movable second meniscus lens 14 and a fixed negative-powered third lens 16 are arranged along a common optical axis, O. The lenses and other system components of FIGS. 5 and 6, while similar to the components of the first embodiment, have different specifications and relationships as now described. The system 100 transmits light received from the object 18 to a sensor array 20 positioned in a focal plane 22 along which an image of the object is presented. In the embodiment illustrated in FIGS. 5 and 6, the second meniscus lens 14 is adjustable along the optical axis to effect image focusing over the object distance which, again, ranges from $L_{OBJ}$=500 mm (FIGS. 6A, 6C) or less to $L_{OBJ}$=∞ (FIGS. 6B, 6D). Lens specifications for the embodiment of FIGS. 5 and 6 differ from the lens specifications for the embodiment of FIGS. 1 and 2.

Still referring to FIG. 5, an adjustable stop 24 is positioned in front of the first meniscus lens 12, which lens receives light from the object 18 into the system 10. As noted for the embodiment of FIGS. 1 and 2, the stop is positioned at the periphery of the front surface 12a of the lens 12. Small displacements of the stop position require modifying the system design to avoid degrading image quality.

The lens 12 includes (i) a concave aspheric surface as the front lens 12a, which faces the object and (ii) a convex parabolic surface 12b of radius −6.2 mm facing the focal plane 22. As described for the first embodiment, the surface 12a is partially transmissive and partially reflective, with a peripheral portion of the lens 12 positioned to refract light entering the lens assembly. For the illustrated embodiments, a central region along the surface 12a includes a reflective surface 12R, e.g., a silvered surface, which is a $12^{th}$ order even asphere. The surface 12R also renders the central region of the surface 12a opaque to transmission of light coming into the system and effects reflections within the system. The surface 12R extends radially from the axis, O, a distance $R_1$=1.1 mm from the optical axis. A transmissive surface 12T extends along an outer portion of the lens surface 12a, beginning at the radial distance $R_1$=1.1 mm from the optical axis. The transmissive surface 12T extends to a radial distance $R_2$=2 mm from the optical axis, O, allowing refraction of light entering into the system 100 for expansion.

A concave parabolic first optical surface 14a of the second lens, of radius −6.2 mm, faces the convex parabolic surface 12b of the first lens in a spaced-apart relation characterized by gap G, e.g., an air gap. The gap G provides a variable separation distance between lenses 12 and 14 along the direction of the optical axis to effect focusing the image along the focal plane 22 coincident with the sensor array 20 for variable distances $L_{OBJ}$. The surface 14a has a radius of curvature complementary to the radius of curvature of the convex parabolic surface 12b. The magnitude of the radius of curvature of each surface 12b, 14a is substantially the same. The range of variable separation distance between adjacent portions the lenses 12 and 14, as measured along the optical axis, extends from 0.002 mm to 0.04 mm. Generally, for other embodiments of the lens system 100, the range of variable separation distance between adjacent portions the lenses 12 and 14 may differ from the range suggested for embodiments according to FIGS. 5 and 6. For example, the range may extend to 0.06 mm or more. By stating that the magnitude of the radius of curvature of each surface 12b and 14a is substantially the same, the meaning of 'substantially' is as described with respect to the embodiment of FIGS. 1 and 2 such that the difference in value between the magnitudes of the complementary radii of curvature is sufficiently small that over the range of separation distance between adjacent portions the lenses 12 and 14, measured along the optical axis, operative portions of the two lens surfaces adjacent one another do not come into physical contact or otherwise exhibit misalignment which causes noticeable degradation in image quality.

A convex, aspheric second optical surface 14b of the second lens faces the focal plane 22. The surface 14b is reflective, having a coating 14R (e.g., a silvered surface) formed thereon to internally reflect light transmitted through the lens surface 14a. The reflective surface 14b is also a $12^{th}$ order even asphere. The second lens 14 includes a bore 26 which extends through each of the lens surfaces 14a, 14b. The bore shape is defined by a lens bore surface $14_{BS}$ which extends along an interior central portion of the lens body. As described for the embodiment of FIGS. 1 and 2, the bore 26 is symmetrically aligned about the optical axis. At each point along the optical axis within the bore, the surface $14_{BS}$ resides a fixed radial distance $R_B$ from the optical axis, while the radial distance $R_B$ varies as a function of position along the optical axis. In the disclosed embodiments the bore shape defined by the surface $14_{BS}$ is frusto-conical. The size of the bore $R_B$ decreases from a maximum radial dimension near the surface 14a.

Commensurate with the coating 14R, the reflective lens surface 14b extends radially outward from points where the surface $14_{BS}$ and the surface 14b meet. This corresponds to a radial distance $R_B$ of 3.0 mm, measured from the optical axis to the lens surface 14b. The reflective lens surface 14b may fully extend to the lens periphery, a radial distance of 3.0 mm from the optical axis.

Along the refractive surface 14a, $R_B$=1.28 mm to allow light to pass to the plano-concave field lens 16, with both optical surfaces of the lens 16 being $10^{th}$ order even aspheres. The lens surface 14a extends radially outward from $R_B$=1.28 mm to the lens periphery, e.g., to a radial distance of 2.66 mm from the optical axis. Commensurate with the coating 14R, the reflective lens surface 14b extends radially outward from points where the surface $14_{BS}$ and the surface 14b meet. This corresponds to a radial distance $R_B$ of 1.25 mm, measured from the optical axis to the lens surface 14b. The reflective lens surface 14b may fully extend to the lens periphery, e.g., a radial distance of 3.0 mm from the optical axis. In the illustrated embodiments the bore 26 is an air cavity into which converging light internally reflected within the first lens 12 is transmitted directly to the third lens without propagating through the body of the second lens 14. In the embodiment of FIGS. 5 and 6, the second lens 14 is movable along the optical axis to focus through a range of object distances $L_{OBJ}$ from 500 mm to ∞. The anterior first surface 16a of the third lens 16 is aspheric and substantially flat, having an infinite radius of curvature. The posterior surface 16b is a concave aspheric surface.

Figure 6A:
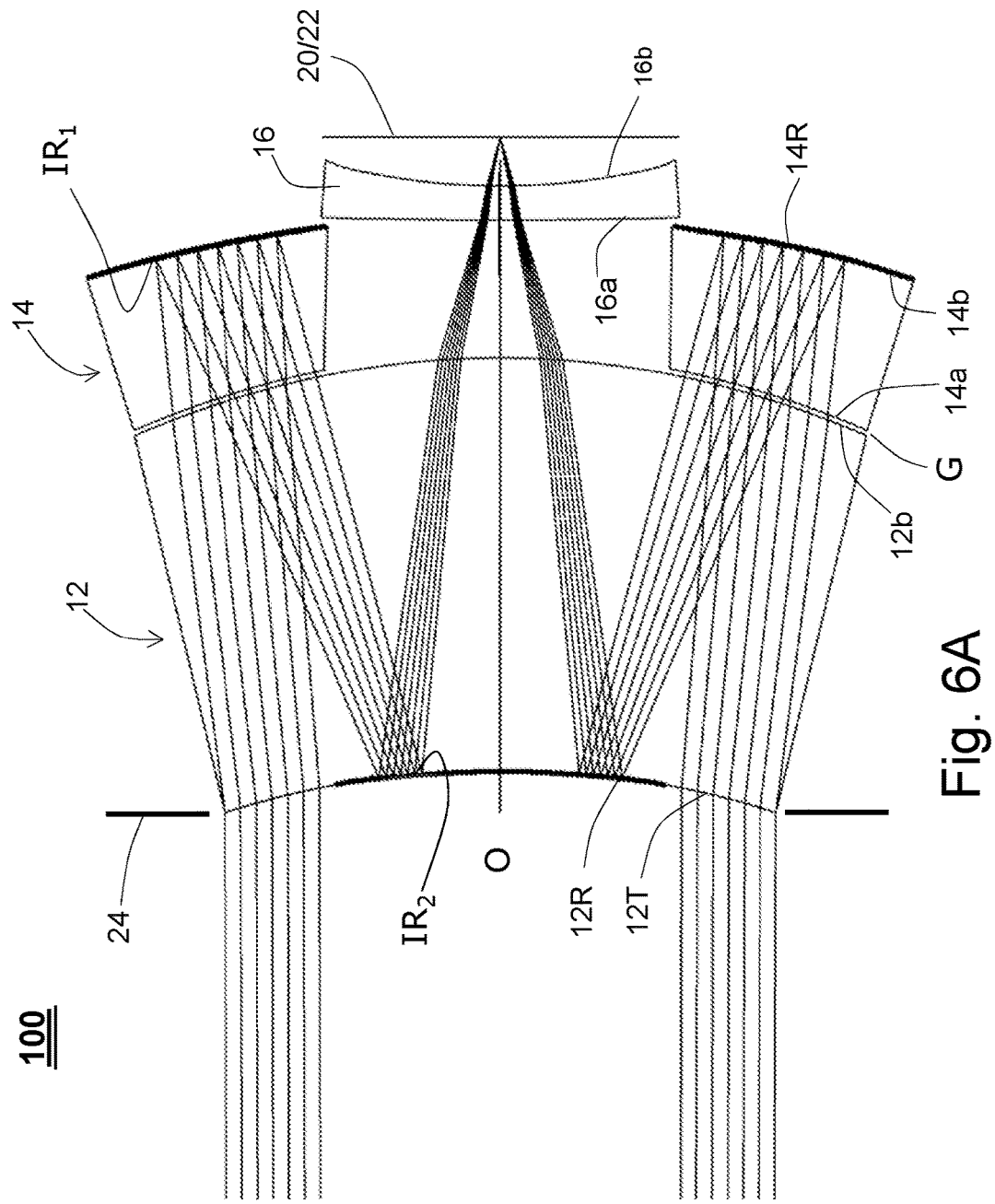
FIGS. 6A-6D are ray diagrams for the lens system of FIG. 5.
Figure 6B:
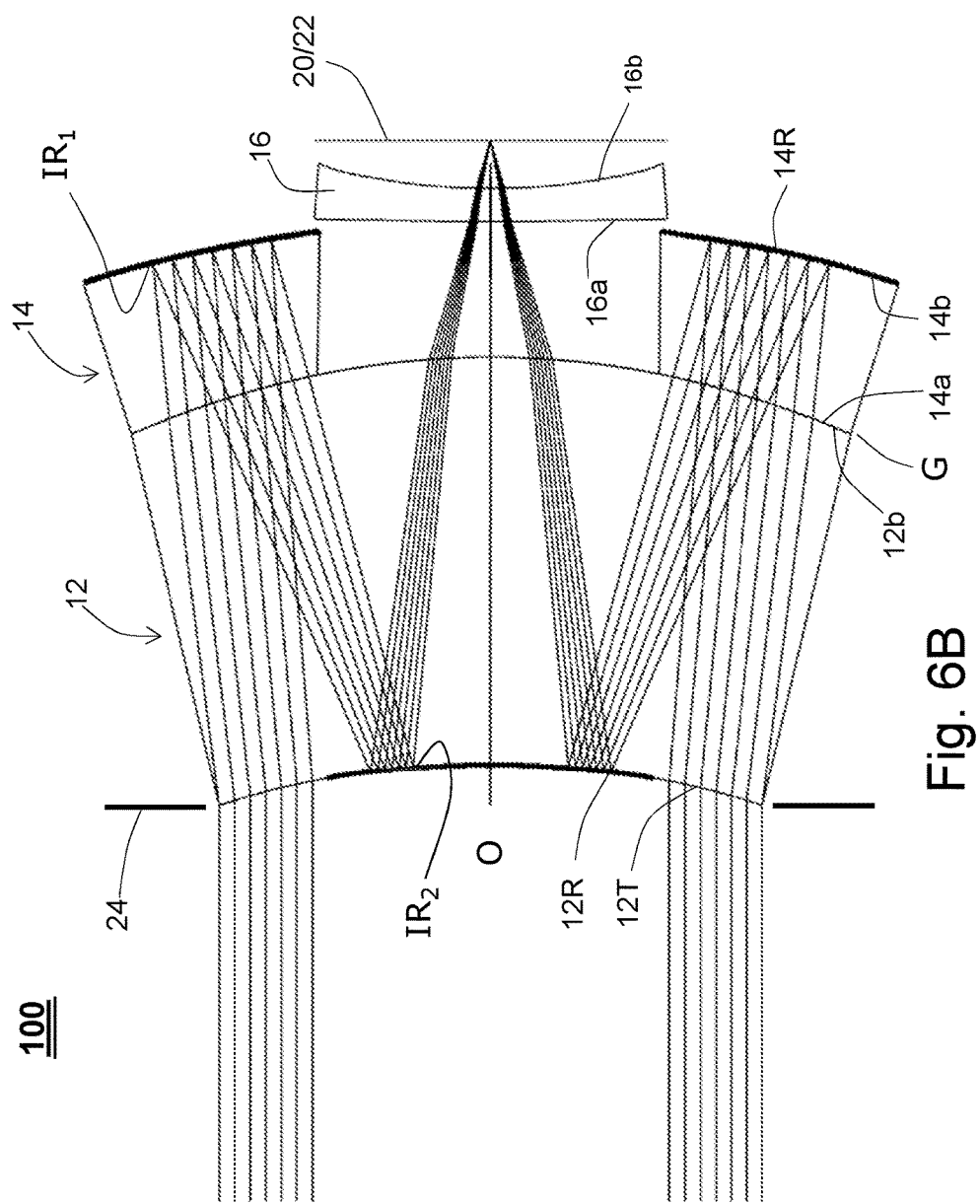
Figure 6C:
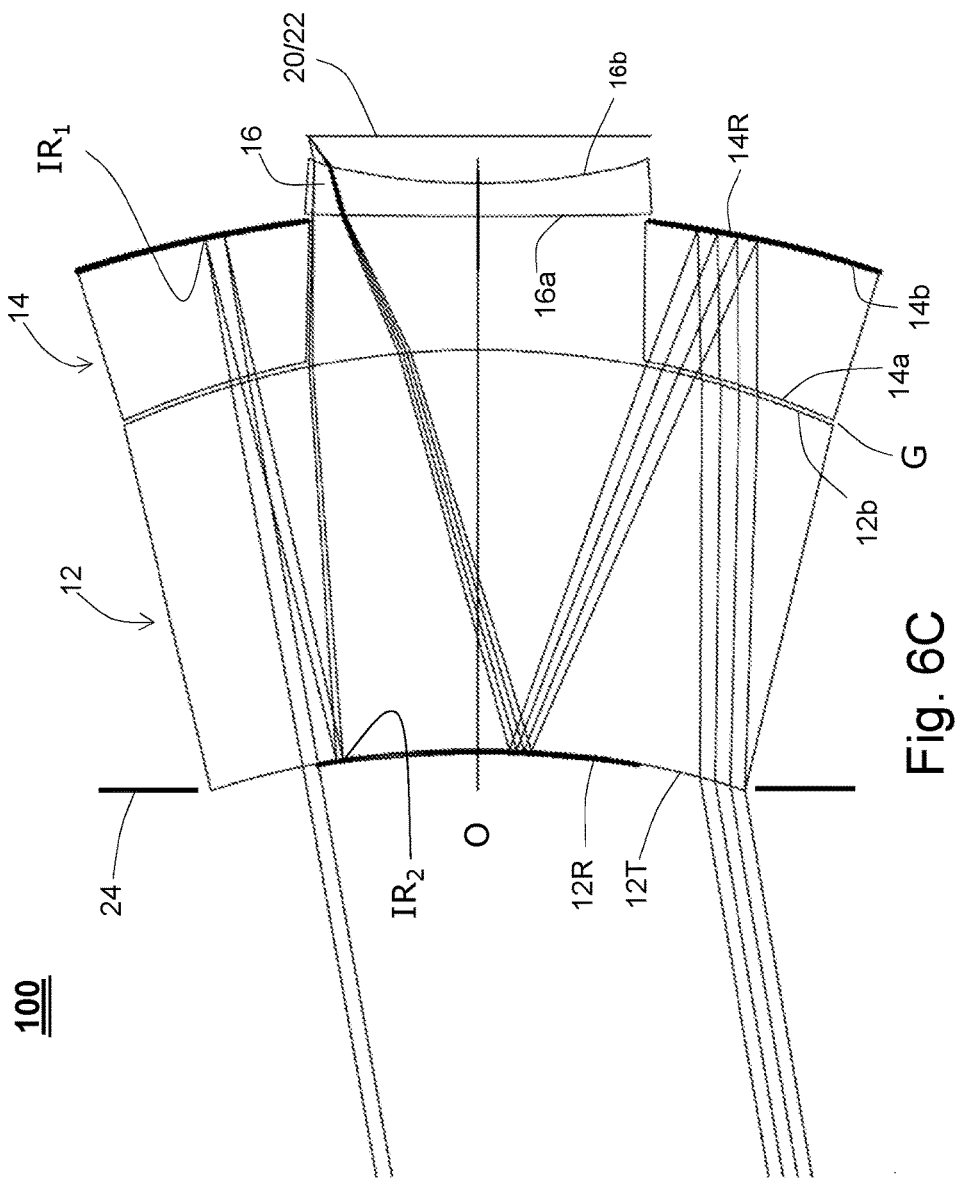
Figure 6D:
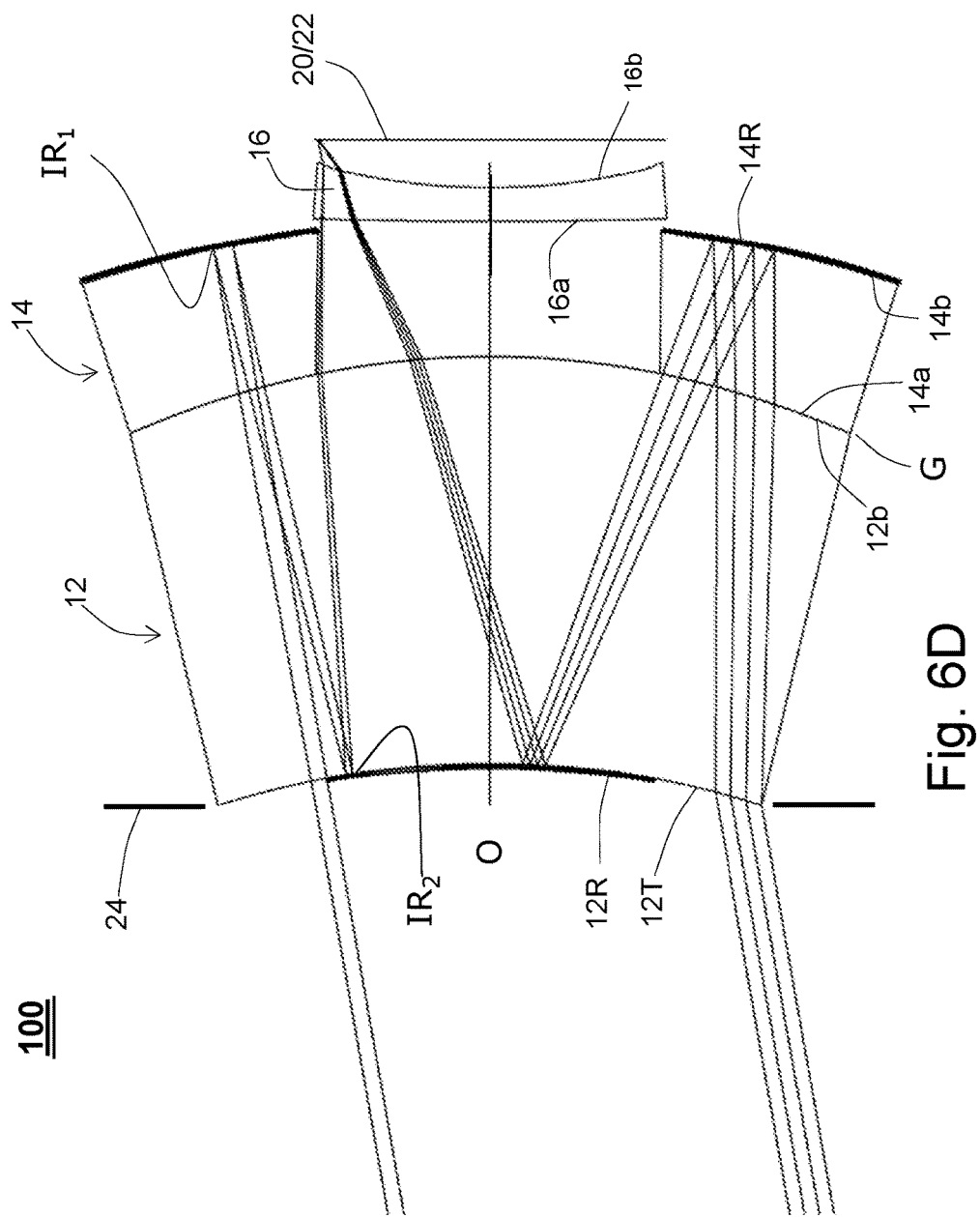

For the configuration of FIG. 5, FIGS. 6A-6D illustrate select ray paths of incoming light travelling from the object 12 and into the lens system 10. FIGS. 6A and 6B illustrate the paths of rays coming into the system 10 when the object 18 is positioned on-axis. In FIG. 6A the lens 14 is positioned 0.04 mm away from the lens 12, as measured along the optical axis, providing a relatively large gap, G, between lenses 12 and 14, to focus the object on the sensor array 20 at a distance $L_{OBJ}$=500 mm. In FIG. 6B the lens 14 is positioned 0.002 mm away from the lens 12, as measured along the optical axis, providing a relatively small gap, G, between lenses 12 and 14, to focus the object on the sensor array 20 when $L_{OBJ}$=∞. FIGS. 6C and 6D illustrate the paths of rays from the object 18 when the object is positioned ten degrees off-axis. In FIG. 6C the lens 14 is positioned 0.04 mm away from the lens 12, as measured along the optical axis, providing a relatively large gap, G, between lenses 12 and 14, to focus the object 12 on the sensor array 20 at the distance $L_{OBJ}$=500 mm. In FIG. 6D the lens 14 is positioned 0.003 mm away from the lens 12, as measured along the optical axis, providing a relatively small gap, G, between lenses 12 and 14, to focus the object on the sensor array 20 when $L_{OBJ}$=∞.

Referring to FIGS. 6A-6D, light travelling from object 18 enters the system 100 through the anterior transmissive lens surface 12T of the first lens 12, passes through the opposing posterior second optical surface 12b, through gap G and through anterior surface 14a of the second lens. The transmitted light then undergoes first internal reflections IR1 along the posterior convex aspheric surface 14b, returning through the lens surface 14a of the second lens 14, through gap G and through the posterior second lens surface 12b of the first lens 12 to be incident along the reflective surface 12R where the light undergoes second internal reflections IR2. After undergoing the multiple internal reflections within the lenses 12 and 14, a portion of the light exits the first lens 12 through the posterior second lens surface 12b to pass through the bore 26 for transmission through the third lens 16 to the focal plane 22. With the lens 12 serving as an objective, the adjustable lens 14 serves to adjust image quality, sharpness, depth or size and refocus the image for varied object distances. The fixed lens 16 could be a field lens stage comprising multiple lens elements to, for example, correct challenging off-axis aberrations including but not limited to field curvature and chief ray angle.

For an exemplary application of the lens system 100, the complementary radii of curvature for the parabolic lens surfaces 12b and 14a are each −6.2 mm. The sag, z, for each rotationally-symmetric aspheric lens surface 12a, 14b, 16a and 16b having a vertex radius of curvature, $r_0$, is calculable from the foregoing exemplary sag equation.

For the embodiment of FIGS. 5 and 6, with $L_{OBJ}$=500 mm, the back focal distance is 0.35 mm and the axial distance between the posterior surface 12b of lens 12 and the anterior surface 16a of lens 16 is 1.0 mm. Tables 1A and 1B provide exemplary specifications for lenses 12, 14 and 16 for an embodiment of the system 100.

Figure 7B:
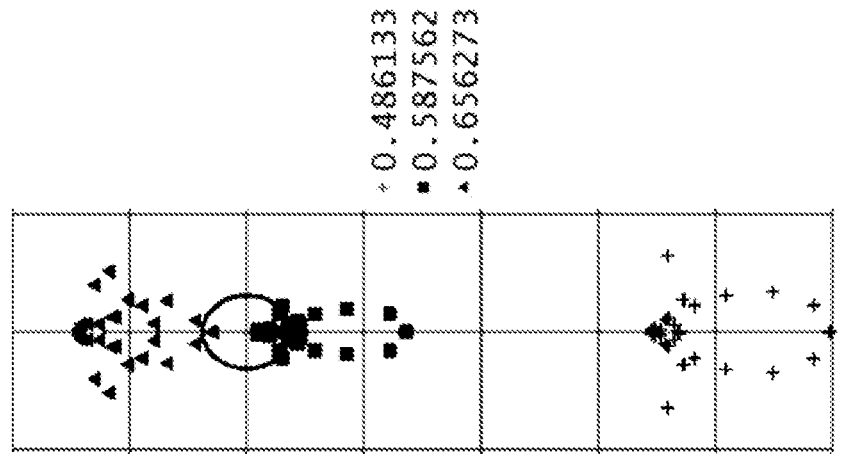
FIGS. 7A and 7B present on-axis and off-axis spot diagrams for the lens system of FIG. 5.
Figure 7A:
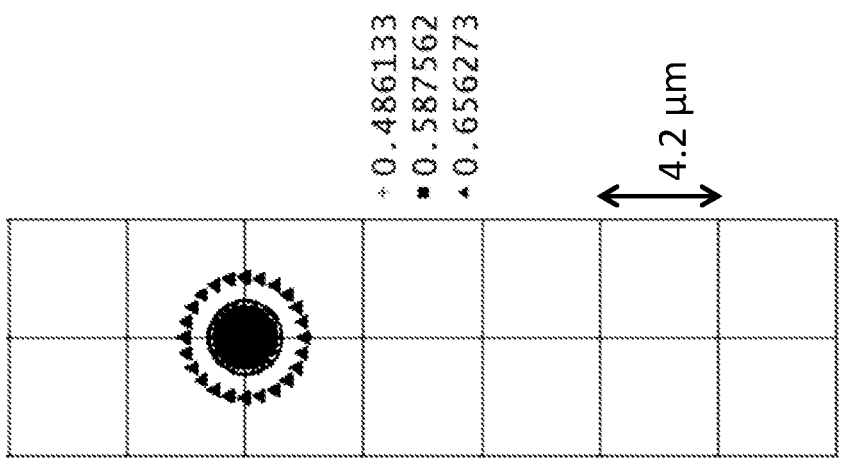

The Total Track Length (TTL) based on the central thickness of the lenses is 4.6 mm. Operating at about f/1.8 the image quality of the lens system 100 is diffraction limited over twenty degrees full field (see FIG. 7) with an Airy disk radius, $R_{Airy}$, of 1.28 microns, which cannot be resolved by using 2 pixels, since the current smallest pixel available is 0.9 micron. Thus, the lens is detector limited. Image distortion is less than 0.3 percent from $L_{OBJ}$ from 500 mm to infinity. The inner side of the lens 14, i.e., along the surface $14_{BS}$, provides for baffling of stray light. Field angles larger than eight to nine degrees are partly vignetted by lens 14. Spot diagrams for the lens system 100 are presented in FIG. 7 at $L_{OBJ}$=500 mm for points on-axis (FIG. 3A, left) and at the full field of 10 degrees (FIG. 3B, right). The legend in FIG. 7 refers to wavelengths in μm. The data were acquired at 0.486133 μm, 0.587562 μm and 0.656273 μm. The Airy disk is shown as a circle with radius 1.28 μm.

Figure 8:
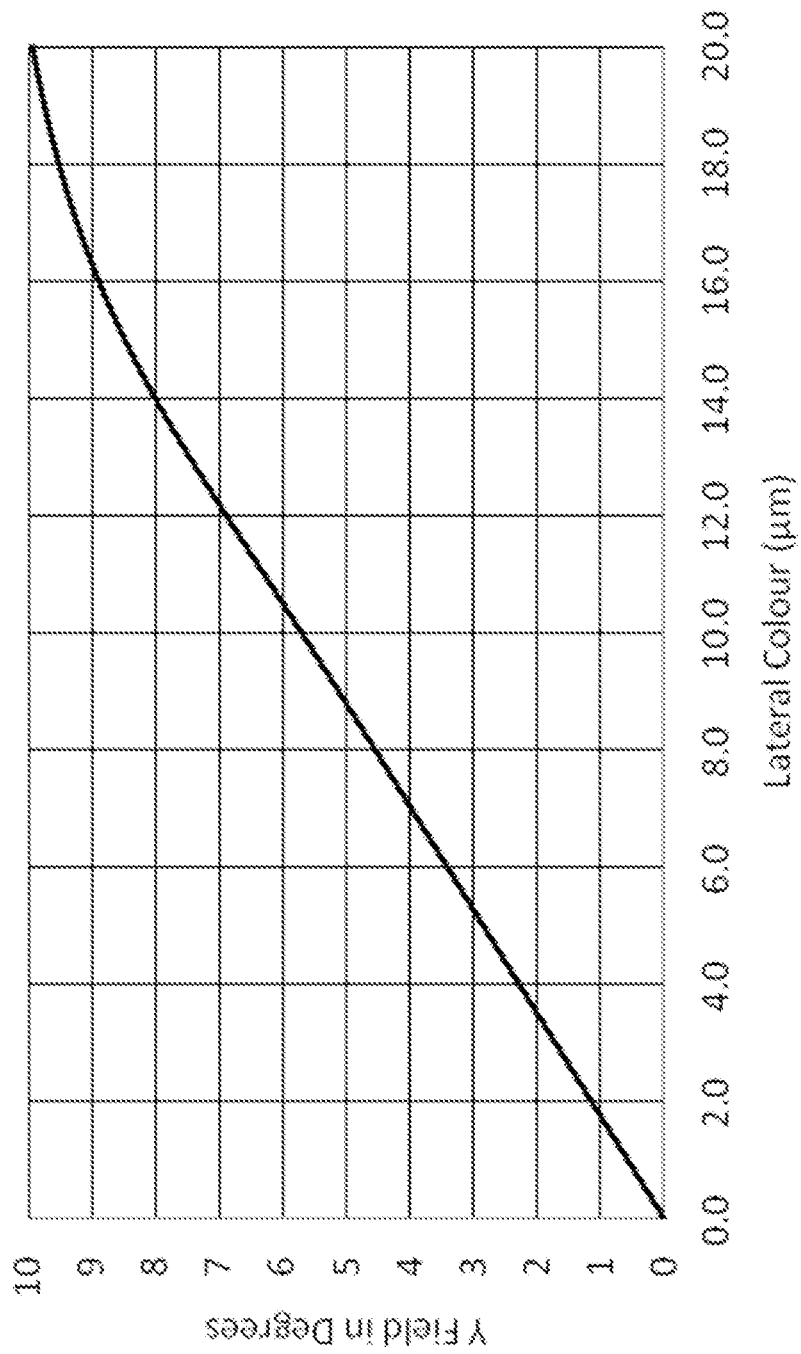
FIG. 8 illustrates a lateral colour distribution for the lens system of FIG. 5.

Lateral colour distribution for the system 100, such as shown in FIG. 8, can be digitally corrected. Image distortion in the system 100 is well controlled. The maximum value does not exceed ±0.3%. The distortion curve does not change when refocusing from the object distance $L_{OBJ}$=500 mm to $L_{OBJ}$=∞. This feature is advantageous in view of image processing required for lateral colour correction. For

TABLE 2A

Sag Equation Polynomial Coefficients for Lens System 100

| Lens | A | B | C | D | E |
|---|---|---|---|---|---|
| 12 (anterior) | $-9.859 \times 10^{-4}$ | $-1.085 \times 10^{-4}$ | $4.2012 \times 10^{-5}$ | $-9.256 \times 10^{-6}$ | $7.5128 \times 10^{-7}$ |
| 14 (posterior) | $-3.172 \times 10^{-4}$ | $3.938 \times 10^{-5}$ | $-8.186 \times 10^{-6}$ | $7.6567 \times 10^{-7}$ | $-2.639 \times 10^{-8}$ |
| 16 (anterior) | 0.0717862 | −0.125670 | 0.08240864 | −0.01829125 | 0 |
| 16 (posterior) | 0.136990 | −0.1715486 | 0.0772950 | $-6.929 \times 10^{-3}$ | 0 |

TABLE 2B

Lens Specifications for Example Embodiment of Lens System 100

| Lens | Anterior Radius | Posterior Radius | Central Thickness | Material | Asphericity |
|---|---|---|---|---|---|
| 12 | −6.9 mm | −6.2 mm | 3.0 mm | SF5 | Anterior Surface |
| 14 | −6.2 mm | −10.0 mm | 1.0 mm | BK7 | Posterior Surface |
| 16 | infinity | 7.8 mm | 0.25 mm | BK7 | Anterior and Posterior Surfaces |

Figure 9C:
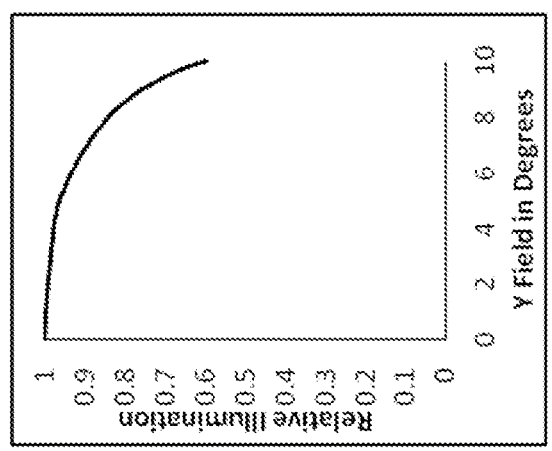
FIG. 9C presents, for the embodiment of FIG. 5, distortion across a ten degree field calculated for $L_{OBJ}$=500 mm and a wavelength of 0.587 μm.
Figure 9B:
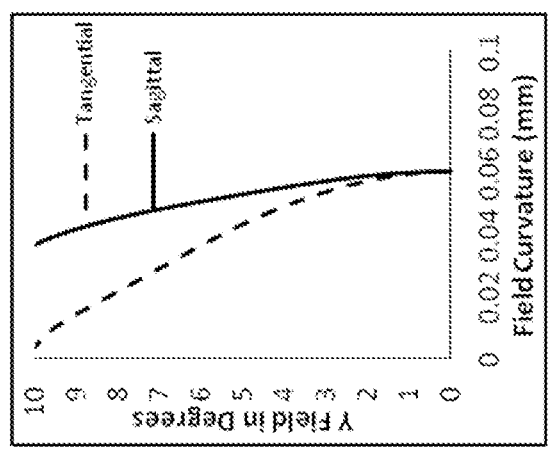
FIG. 9B presents, for the embodiment of FIG. 5, field curvature calculated for $L_{OBJ}$=500 mm and a wavelength of 0.587 μm.
Figure 9A:
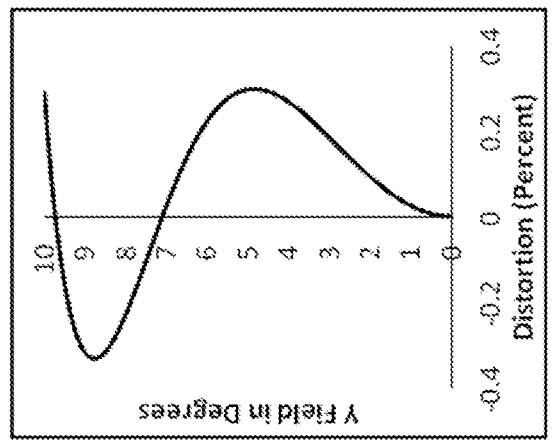
FIG. 9A presents, for the embodiment of FIG. 5, relative illumination and distortion across a ten degree field, calculated for $L_{OBJ}$=500 mm and a wavelength of 0.587 μm.

To summarize features of the system 100, two meniscus lenses 12 and 14 are brought close together with their parabolic surfaces (each having radius of curvature of −6.32 mm) in almost full contact (i.e., an axial separation on the order of 0.01 mm). The other surfaces of these lenses are used to perform internal reflections, each being modified according to a $12^{th}$ order even asphere sag equation. With a portion of the aspheric surface 12A of the front lens used as a refractive surface, having an aperture diameter ranging from $D_{min}$=2.2 mm to $D_{max}$=4 mm, this results in transmission of approximately 70 percent of light incident on the surface 12a passing through the transmissive lens surface 12T. The second lens 14 includes a central bore opening which may, for example, be cylindrical or frusto-conical in shape, through which light passes to the third lens 16, which acts as both a field lens while the second lens 14 acts as a refocusing element. The object distance range of focus is from infinity to 500 mm. The full field of view is 20 degrees, which corresponds to 200 mm linear size in object space (at $L_{OBJ}$=567 mm) and a 2.8 mm image diameter on the sensor array 20, nominally sufficient to capture the head of a subject at a minimum distance of about 600 mm.

the lens system 100, FIGS. 9A to 9C respectively present relative illumination, field curvature and distortion across a ten degree field, calculated for $L_{OBJ}$=500 mm and a wavelength of 0.587 μm.

Embodiments of a small form-factor lens system have been described which is suitably sized for use within the form factor of a smartphone casing. Embodiments of the invention provide an alternative to the multi-element lens systems which are limited in terms of available degrees of freedom and ability to meet desirable metrics such as low f-number and large aperture. For applications specifically directed to portraiture photography with a dual lens system camera in a mobile phone device, the design is not constrained to the conventional requirement for an all-round high-performing lens, which normally precludes attaining certain performance specifications at the expense of compromising another specification.

To achieve a desired reduction in depth of field (DoF), embodiments are based on the geometrical relationship between DoF and lens aperture diameter, combining a relatively large diameter that reduces depth of field (e.g., by a factor of four) with f/D yielding a relatively large focal length. Exemplary systems are based on a catadioptric lens design with a double ray path, this reducing the field of view. Unlike typical lens designs used in mobile phone devices, larger diameter lenses are incorporated to reduce the depth of field by a factor of four or larger. Specifically, the disclosed lens systems each exhibit a depth of field at 500 mm reduced by a factor of four compared to typical lenses with D=2 mm. For the system 10, with $L_{OBJ}=\infty$, the central thickness is 4.5 mm, whereas f=7.9 mm, having a tele-photo effect of 1.76. With $L_{OBJ}=\infty$, the central thickness of the system 100 is 4.6 mm and f=7.2 mm, giving this design a tele-photo effect of 1.57. The fast f/2.0 lens with central obscuration of 2.4/4=0.60 helps reduce depth of field with the system 10. The fast f/1.8 lens with central obscuration of 2.2/4=0.55 helps reduce depth of field with the system 100. The systems 10 and 100 exhibit diffraction-limited image quality for R, G and B with: for the system 10, an Airy disk radius of 1.4 µm (pixel limited) and, for the system 100, an Airy disk radius of 1.3 µm (pixel limited). With the bore 26 of the system 10 extending 2 mm along the optical axis, the bore surface 14$_{BS}$ advantageously acts to provide relatively effective stray light baffling. The system 100 exhibits good relative illumination with only small vignetting at the edge of the field, and focusing over the entire range is effected with movement of lens 14 by only 0.04 mm of travel. In the system 10, lens movement for focusing over the distance ranging from infinity to 500 mm is 0.57 mm.

The invention is not limited to the described embodiments, which may be amended or modified without departing from the scope of the present invention. Rather, the invention is only limited by the claims which follow.

The claimed invention is:

1. A lens system comprising:
    first and second lenses aligned along an optical axis for transmitting light from an object along a path toward a focal plane,
    the first lens including an anterior first surface through which received light can enter into the lens system and a posterior convex parabolic second surface having a first radius of curvature,
    the second lens including an anterior concave parabolic first surface characterized by a second radius of curvature, complementary to the first radius of curvature of the second surface of the first lens, where the concave parabolic first surface of the second lens is positioned to face the convex parabolic second surface of the first lens in spaced apart relation from the convex parabolic second surface of the first lens.

2. The lens system of claim 1 where the magnitude of the radius of curvature of the posterior convex parabolic second surface of the first lens and the anterior concave parabolic first surface of the second lens are substantially the same.

3. The lens system of claim 2 where, along operative portions of the optical surfaces, for adjacent portions of said surfaces, the difference in value between the magnitudes of the complementary radii of curvature is sufficiently small that the operative portions of said lens surfaces adjacent one another do not come into physical contact or otherwise exhibit misalignment which causes noticeable degradation in image quality.

4. The lens system of claim 1 where the concave parabolic first surface of the second lens is spaced apart from the convex parabolic second surface of the first lens by a fixed gap distance measured along the optical axis.

5. The lens system of claim 1 where the fixed gap distance measured along the optical axis does not exceed 0.06 mm for all operative portions of the spaced apart surfaces through which light passes before becoming focused.

6. The lens system of claim 4 further including a third lens adjustably positionable along the optical axis between the second lens and the focal plane for focus adjustment of the image as a function of change in object distance $L_{OBJ}$ from the posterior surface of the first lens.

7. The lens system of claim 1 where the concave parabolic first surface of the second lens is spaced apart from the convex parabolic second surface of the first lens by a gap distance measured along the optical axis, and the gap distance is adjustable along the optical axis for focus adjustment of the image over a range in object distance $L_{OBJ}$ measured from the posterior surface of the first lens.

8. The lens system of claim 7 where the adjustable gap distance, as measured along the optical axis, does not exceed 0.06 mm for all operative portions of the spaced apart surfaces through which light passes before becoming focused.

9. The lens system of claim 1 where the anterior first surface of the first lens includes a concave parabolic surface positioned to receive and refract light traveling from an object for entry into the lens system-through the first lens for focusing along the focal plane.

10. The lens system of claim 1 where the first lens is a meniscus lens.

11. The lens system of claim 1 where the second lens is a meniscus lens.

12. The lens configuration of claim 1 where the lenses are configured to focus images of objects on the focal plane over a range of object distances $L_{OBJ}$ extending from 500 mm or less to $L_{OBJ}=\infty$.

13. The lens configuration of claim 1 where the second lens includes a bore positioned along the optical axis.

14. The lens configuration of claim 13 where the path of light transmitted through the first meniscus lens passes through the bore.

15. The lens configuration of claim 13 where the path of light transmitted through the first meniscus lens passes through the bore.

16. The lens configuration of claim 13 where the bore is centrally positioned within the second meniscus lens and extends through a posterior surface of the second lens and through a field lens.

17. The lens configuration of claim 16 where the posterior surface of the second lens comprises a coating for internal reflection of light received from the object, causing light to pass through the first lens at least two times.

18. A method for generating an image with light received from an object on an imaging sensor array plane, comprising:
    providing a first lens along an optical axis between the object and the sensor array, the first lens including an anterior first surface through which received light can enter into the lens and a posterior convex parabolic second surface having a first radius of curvature,
    providing a second lens along the optical axis, the second lens including an anterior concave parabolic first surface characterized by a second radius of curvature, complementary to the first radius of curvature of the second surface of the first lens,
    positioning the concave parabolic first surface of the second lens to face the convex parabolic second surface of the first lens in spaced apart relation from the convex parabolic second surface of the first lens.

19. The method of claim 18 where the concave parabolic first surface of the second lens is spaced apart from the convex parabolic second surface of the first lens by a variable gap distance measured along the optical axis, the method further including adjusting the gap distance along the optical axis to adjust focus over a range in object distance $L_{OBJ}$ measured from the posterior surface of the first lens.

* * * * *